(12) United States Patent
Konda et al.

(10) Patent No.: US 12,184,608 B2
(45) Date of Patent: *Dec. 31, 2024

(54) SECURE DNS USING DELEGATED CREDENTIALS AND KEYLESS SSL

(71) Applicant: McAfee, LLC, San Jose, CA (US)

(72) Inventors: Tirumaleswar Reddy Konda, Bangalore (IN); Shashank Jain, Bangalore (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,449

(22) Filed: Jan. 16, 2024

(65) Prior Publication Data

US 2024/0154937 A1 May 9, 2024

Related U.S. Application Data

(63) Continuation of application No. 17/402,271, filed on Aug. 13, 2021, now Pat. No. 11,876,779.

(30) Foreign Application Priority Data

Mar. 30, 2021 (IN) .............................. 202141014288

(51) Int. Cl.
*H04L 29/06* (2006.01)
*G06F 8/65* (2018.01)
(Continued)

(52) U.S. Cl.
CPC ........ *H04L 63/0209* (2013.01); *H04L 9/3073* (2013.01); *H04L 61/4511* (2022.05);
(Continued)

(58) Field of Classification Search
CPC ............. H04L 63/0209; H04L 61/4511; H04L 67/568; H04L 9/3073; H04L 63/04; H04L 63/0823; H04L 63/168; G06F 8/65
(Continued)

(56) References Cited

U.S. PATENT DOCUMENTS 11,153,080 B1 * 10/2021 Nix ........................ H04L 9/3093
2017/0272250 A1 * 9/2017 Kaliski, Jr. ........... H04L 9/3239
(Continued)

OTHER PUBLICATIONS

Chuat et al., "SoK: Delegation and Revocation, the Missing Links in the Web's Chain of Trust" IEEE European Symposium on Security and Privacy, pp. 624-636, 2020. (Year: 2020).*
(Continued)

*Primary Examiner* — Thanh T Le
(74) *Attorney, Agent, or Firm* — Patent Capital Group

(57) ABSTRACT

There is disclosed in an example a gateway device, including a hardware computing platform, and a secure domain name system (DNS) engine having circuitry and stored instructions to program the circuitry, the secure DNS engine to communicatively couple to an endpoint via a local network, begin a secure DNS transaction with the endpoint, determine whether the endpoint supports delegated credentials, and after determining that the endpoint supports delegated credentials, establish a secure DNS session with the endpoint using a delegated credential.

20 Claims, 13 Drawing Sheets

(51) Int. Cl.
*H04L 9/30* (2006.01)
*H04L 9/40* (2022.01)
*H04L 29/08* (2006.01)
*H04L 29/12* (2006.01)
*H04L 61/4511* (2022.01)
*H04L 67/568* (2022.01)

(52) U.S. Cl.
CPC .......... *H04L 63/04* (2013.01); *H04L 63/0823* (2013.01); *H04L 63/168* (2013.01); *H04L 67/568* (2022.05); *G06F 8/65* (2013.01)

(58) Field of Classification Search
USPC ............................................................ 726/5
See application file for complete search history.

(56) References Cited

U.S. PATENT DOCUMENTS

2017/0359723 A1* 12/2017 Pal ........................ H04L 63/083
2019/0260594 A1* 8/2019 Singhal ................... H04L 63/06
2020/0162270 A1* 5/2020 Du ...................... H04L 63/0428

OTHER PUBLICATIONS

"Go Keyless," cloudflare/gokeyless: Go Implementaion of the Keyless Protocol, GitHub, https://github.com/cloudflare/keyless; Jun. 29, 2021; 9 pages.

Barnes, R., et al., Delegated Credentials for TLS, draft-ietf-tls-subcerts-10, IETF Network Working Group Internet Draft, Jan. 24, 2021; 19 pages.

Boucadair, M., et al., "DHCP and Router Advertisement Options for the Discovery of Network-designated Resolvers (DNR), draft-ietf-add-dnr-o2," IETF Internet Draft; May 17, 2021; 20 pages.

Chuat et al., "SoK: Delegation and Revocation, the Missing Links in the Web's Chain of Trust," IEEE European Symposium Security and Privacy, pp. 624-636 (Year: 2020).

* cited by examiner

SECURE DNS USING DELEGATED CREDENTIALS AND KEYLESS SSL

This application is a continuation of U.S. application Ser. No. 17/402,271 filed Aug. 13, 2021 and entitled, "SECURE DNS USING DELEGATED CREDENTIALS AND KEYLESS SSL," and claims priority to Indian Provisional Application 202141014288, titled "CERTIFICATE MANAGEMENT MECHANISM FOR DEPLOYING A DOH/DOT CAPABLE DNS FORWARDER ON HOME ROUTERS," filed Mar. 30, 2021, both of which are incorporated herein by reference.

FIELD OF THE SPECIFICATION

This application relates in general to computer security, and more particularly though not exclusively to a system and method for providing secure DNS services using delegated credentials and/or keyless SSL.

BACKGROUND

Domain name system (DNS) is a key component of the modern internet. A DNS server receives a DNS request with a domain name, and looks up a corresponding internet protocol (IP) address for the domain name. Classical or legacy DNS is an unencrypted and unsecured system that provides DNS queries on port 53, and is sometimes referred to as "Do53" (i.e., "DNS over port 53").

Transport layer security (TLS) is an encryption technology used in secure hypertext transfer protocol (HTTPS). Relatively recent innovations in DNS include DNS over TLS (DoT) and DNS over HTTPS (DoH). They are similar in that they both use TLS encryption, but they were developed separately. For example, DoT uses a dedicated port (port 853), which means that the fact of DNS traffic can be observed by observing traffic on port 853 (even if the traffic cannot be encrypted). In contrast, DoH uses the same port (port 443) that regular HTTPS traffic uses, meaning that it is difficult or impossible to differentiate DoH traffic from other HTTPS traffic.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
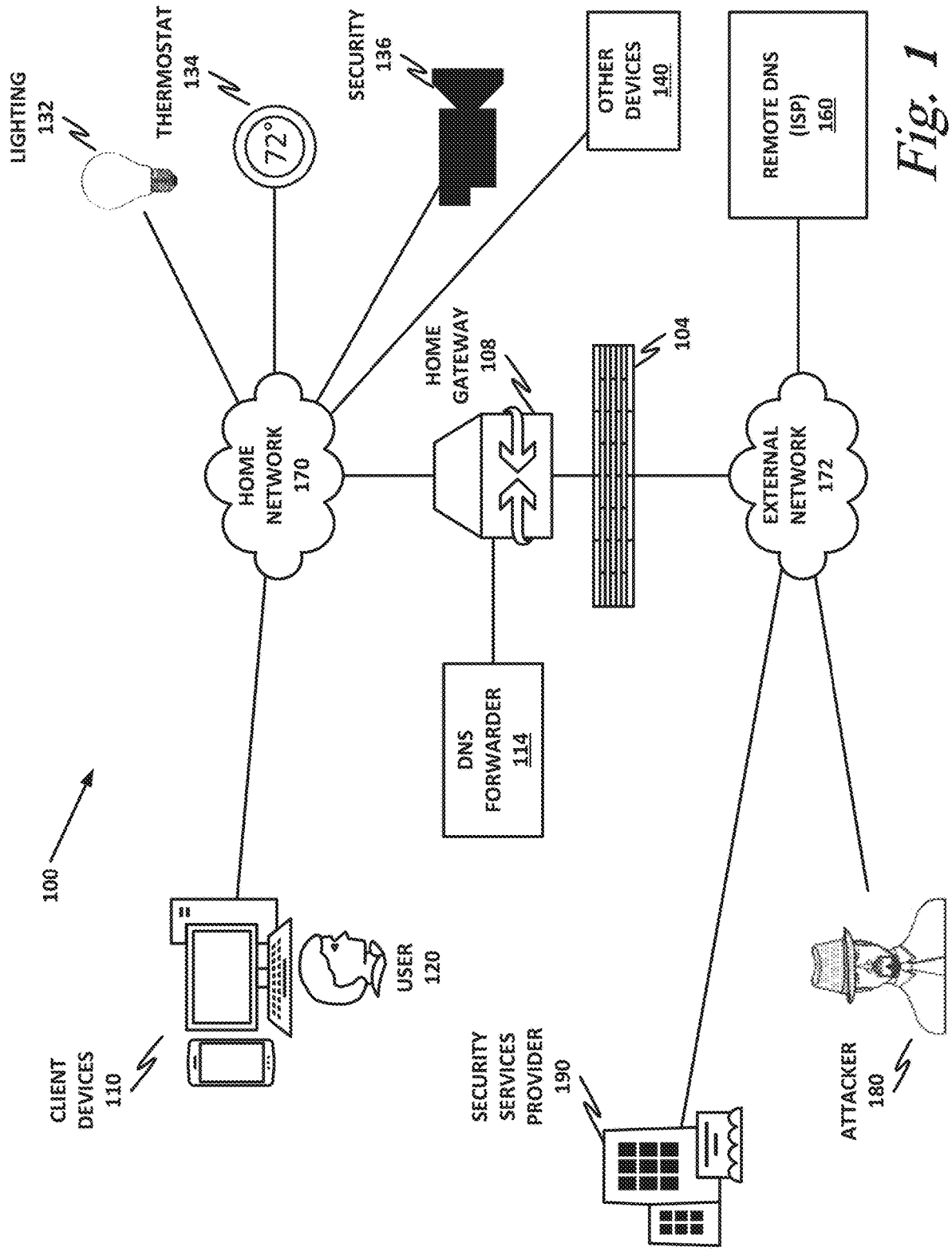
FIG. 1 is a block diagram of selected elements of a security ecosystem.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a gateway device. The gateway device also includes a hardware computing platform. The device also includes a secure domain name system (DNS) engine may include circuitry and stored instructions to program the circuitry, the secure DNS engine to: communicatively couple to an endpoint via a local network; begin a secure DNS transaction with the endpoint; determine whether the endpoint device supports delegated credentials; after determining that the endpoint supports delegated credentials, establish a secure DNS session with the endpoint using a delegated credential. Other embodiments of this aspect include corresponding computer systems, apparatus, and computer programs recorded on one or more computer storage devices, each configured to perform the actions of the methods.

Implementations may include one or more of the following features. The gateway device where the DNS engine is to provide a caching DNS server. The delegated credential is signed with a domain-validated certificate of a cloud service. The gateway device is a consumer home gateway. The gateway device is an enterprise home gateway. The delegated credential includes a private key, a signature verification algorithm, and an expiry. The expiry has a maximum term of seven days. Securing the secure DNS transaction may include including the delegated credentials as an extension in a certificate entry of an end-entity certificate. The DNS engine is to provide a DNS forwarder. Beginning the secure DNS transaction may include receiving a client hello with a delegated credentials extension. The DNS engine is to determine that the endpoint does not support delegated credentials, and to secure the secure DNS transaction via keyless secure socket layer (SSL). The DNS engine is further to determine that the endpoint does not support delegated credentials, that the endpoint runs software that can be updated to support delegated credentials, and provide a recommendation to update the software. The software is an operating system. The DNS engine is further to provide unsecured legacy DNS services via port 53. The DNS engine is to provide the unsecured legacy DNS services only to endpoints that do not support secure DNS. The DNS engine is further to enroll with a cloud service via enrollment over secure transport (EST). Enrolling with the cloud service may include receiving an identity certificate. The DNS engine is further to generate a key pair to secure communication with the cloud service. Implementations of the described techniques may include hardware, a method or process, or computer software on a computer-accessible medium.

One general aspect includes one or more tangible. The non-transitory computer-readable storage media also includes provide a secure DNS forwarding function secured by an end-entity certificate. The media also includes receive a delegated credential from a cloud service. The media also includes begin a secure DNS transaction with an endpoint. The media also includes determine that the endpoint supports delegated credentials. The media also includes secure the secure DNS transaction with the delegated credentials. Other embodiments of this aspect include corresponding computer systems, apparatus, and computer programs recorded on one or more computer storage devices, each configured to perform the actions of the methods.

Implementations may include one or more of the following features. The one or more tangible, non-transitory computer-readable media where the instructions are further to provide a caching DNS server. The delegated credential is signed with a domain-validated certificate of a cloud service. Securing the secure DNS transaction may include including the delegated credentials as an extension in a certificate entry of an end-entity certificate. The instructions are further to provide a consumer home gateway. The instructions are further to provide an enterprise home gateway. The delegated credential includes a private key, a signature verification algorithm, and an expiry. The expiry has a maximum term of seven days. The instructions are further to provide a DNS forwarder. Beginning the secure DNS transaction may include receiving a client hello with a delegated credentials extension. The instructions are further to determine that the endpoint does not support delegated credentials, and to secure the secure DNS transaction via keyless SSL. The instructions are further to determine that the endpoint does not support delegated credentials, that the endpoint runs software that can be updated to support delegated credentials, and provide a recommendation to update the software. The software is an operating system. The instructions are further to provide unsecured legacy DNS services via port 53. The instructions are further to provide the unsecured legacy DNS services only to endpoints that do not support secure DNS. The instructions are further to enroll with a cloud service via enrollment over secure transport (EST). Enrolling with the cloud service may include receiving an identity certificate. The instructions are further to generate a key pair to secure communication with the cloud service. Implementations of the described techniques may include hardware, a method or process, or computer software on a computer-accessible medium.

One general aspect includes a computer-implemented method. The computer-implemented method also includes receiving from a cloud service a delegated cryptographic credential. The method also includes identifying, on a local network, an endpoint device that supports delegated credential encryption. The method also includes beginning a secure domain name system (DNS) transaction with the endpoint. The method also includes encrypting the secure DNS transaction with the delegated cryptographic credential. Other embodiments of this aspect include corresponding computer systems, apparatus, and computer programs recorded on one or more computer storage devices, each configured to perform the actions of the methods.

Implementations may include one or more of the following features. The method may include providing a caching DNS server. The delegated credential is signed with a domain-validated certificate of a cloud service. Securing the secure DNS transaction may include including the delegated cryptographic credential is an extension in a certificate entry of an end-entity certificate. An apparatus may include means for performing the method. The means for performing the method may include a processor and a memory. The memory may include machine-readable instructions that, when executed, cause the apparatus to perform the method. The apparatus is a computing system. At least one computer-readable medium may include instructions that, when executed, implement a method or realize an apparatus. The method may include providing a consumer home gateway. The method may include providing an enterprise home gateway. The delegated credential includes a private key, a signature verification algorithm, and an expiry. The expiry has a maximum term of seven days. The method may include providing a DNS forwarder. Beginning the secure DNS transaction may include receiving a client hello with a delegated credentials extension. The method may include determining that the endpoint does not support delegated credentials, and securing the secure DNS transaction via keyless SSL. The method may include determining that the endpoint does not support delegated credentials, that the endpoint runs software that can be updated to support delegated credentials, and providing a recommendation to update the software. The software is an operating system. The method may include providing unsecured legacy DNS services via port 53. The method may include providing the unsecured legacy DNS services only to endpoints that do not support secure DNS. The method may include enrolling with a cloud service via enrollment over secure transport (EST). Enrolling over EST may include receiving an identity certificate. The method may include generating a key pair to secure communication with the cloud service. Implementations of the described techniques may include hardware, a method or process, or computer software on a computer-accessible medium.

One general aspect includes at least one computer-readable medium may include instructions that other embodiments of this aspect include corresponding computer systems, apparatus, and computer programs recorded on one or more computer storage devices, each configured to perform the actions of the methods.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Commonly, enterprises may provide a gateway to act as an access point between the enterprise and the internet, at large. As used in this specification, an enterprise may include a business, government, other enterprise, charity, family, church, community, or any other group that provides a shared network. The gateway that services the enterprise may be referred to as a "home gateway," regardless of the type of enterprise. However, in cases where is it valuable to differentiate between types of enterprises, a "consumer home gateway" may refer to a consumer-grade device, which is generally targeted at home, family, or other smaller groups, while an "enterprise home gateway" may refer to a higher-end device that is generally targeted at larger groups, companies, or others who require greater functionality.

A home gateway of any species may provide a caching DNS server or a DNS forwarder. These can increase the speed of DNS queries for domain names that have recently been accessed. Commonly, a DNS cache may have a time to live (TTL), after which the DNS query may need to be refreshed. This provides enhanced speed, because internet users commonly access a relatively limited number of domain names over and over again. Because these queries do not need to go to the outside DNS server, they can be serviced much more quickly. After the TTL expires (e.g., after a timeout period such as 24 hours), the cached DNS entry is purged, and the next query may go out to the original DNS server. However, once again, it is common for users to access the same domain name multiple times. Thus, these queries may hit the DNS cache until the next timeout.

Another benefit of a caching DNS server on the local enterprise gateway is that it can be used to provide privacy, security, and policy enforcement for the enterprise. For example, the use of a caching DNS server limits the ability of the outside DNS server to know how often a particular domain name is accessed by enterprise users. Because the caching DNS server requests the IP address for the domain name only once per TTL, the outside DNS server does not know how many more times the domain name is accessed during that TTL. The DNS server may employ workarounds to this issue, such as by providing a shortened TTL.

In a network, both internal and external DNS-based attacks can happen. Additionally, pervasive monitoring and modification of DNS messages within an enterprise network is also possible. Thus, the use of privacy and security enabling DNS servers ensures that the DNS communications are secure end-to-end. Recent internet engineering task force (IETF) request for comment (RFC) documents have proposed standards for securing DNS. These include DoT (specified in RFC 7858), and DoH (specified in RFC 8484). Although these are different standards, with different advantages and challenges, for convenience they are referred to collectively in this specification as "secure DNS," which should be understood to include both DoH and DoT, and to exclude legacy Do53. Secure DNS, as used in this specification, is also separate from "DNS Security Extensions" (sometimes called DNSSEC), as specified in IETF RFC 2353 and its successors. Notably, DNSSEC verifies the identities of DNS root servers, thus helping to prevent DNS injection attacks, but does not "secure" DNS transactions in the sense of encrypting them. "Secure DNS" is also intended to include any future evolutions in encrypted DNS transactions that may be adopted after the date of filing, including in successor documents to RFC 7858 and 8484, or other new standards that provide for encrypted DNS traffic.

Home gateways have traditionally provided DNS filtering. For example, a family or a nonfamily enterprise may maintain categories of domain names that are blocked, or otherwise restricted. For example, a family may choose to restrict access to pornography, advocacy for illegal or dangerous activity, or other content that is contrary to the family's values. A business or government enterprise may choose to categorize domain names into multiple categories. For example, domain names that are directly related to the enterprise's business operations may be unrestricted. Another category of domain names may include domains that are not restricted, but that are not directly related to the business or government function. These may require, for example, user verification and/or may be subject to special logging. Other domain names may be blocked outright by the enterprise.

Thus, domain name caching and forwarding may be used within an enterprise, including within a family, to provide parental and access controls, block malicious domains, or provide other features.

Secure DNS raises challenges for such caching and filtering functions. For example, if an endpoint is configured to use internet-hosted or public DoH or DoT servers, local DNS servers cannot service the encrypted DNS requests. Thus, the local caching DNS server may be prevented from providing services to local endpoints, and may not be able to enforce DNS filtering.

In some cases, browser platforms such as Firefox and operating systems like Android come preconfigured to use internet services hosted via public DoH and DoT servers. While these evolving standards can help to address users' privacy concerns and provide security to a certain extent, they may frustrate the enterprise or family's ability to provide legitimate controls over the use of its network.

Evolving DNS standards such as DoH and DoT also have major implications on security solutions. For example, MCAFEE, LLC provides Secure Home Platform (SHP), which is a home security service that provides, among other things, DNS forwarding and DNS caching with domain name filtering. However, if DNS traffic is encrypted, SHP and other home or enterprise security systems that are co-located on the home or enterprise cannot act on DNS requests from the endpoint and enforce their DNS filtering.

Furthermore, if the endpoint is an internet of things (IoT) device that is configured to use public DoH services, SHP or similar security platforms cannot enforce, for example, manufacturer usage description (MUD) rules that only allow intended communications to and from the IoT device.

In other words, an enterprise gateway or home security module such as SHP may not be able to enforce the network access control list (ACL) rules based on domain names that it is configured to accept.

Some effective solutions to providing additional services such as security and access control in a secure DNS infrastructure can be realized by partnering with an internet service provider (ISP) or a plurality of ISPs. If the ISPs are willing to adopt or adapt to new standards, then a client software on the consumer endpoint can be provided with a secure DNS server on the ISP's DNS server. However, this is not always a practical solution. In some cases, ISPs may be unable or unwilling to adopt new standards that provide secure DNS.

Thus, home gateways like SHP provided by MCAFEE, LLC or enterprise gateways may be blocked from providing their traditional security services in a DoH or DoT context. Furthermore, if the endpoint is an IoT device that is configured to use public DoH servers, a home gateway such as SHP or similar may be unable to enforce MUD rules to allow only intended communications to and from the IoT device.

A current proposed standard defines a mechanism to securely bootstrap endpoint devices with the authentication domain name (ADN) and DNS server certificate of the local network's secure DNS server. This provides for a mechanism for endpoints in a home network to discover DoT/DoH servers hosted in the ISP cloud, integrated with home gateway filtering policies. These can be further integrated with a global database, such as Global Threat Intelligence (GTI) provided by MCAFEE, LLC, to enforce DNS-based content filtering.

This mechanism is compatible with ISPs deploying DNS recursive servers with partners like Open-Xchange offering PowerDNS for DNS resolving services. The mechanism also works for ISPs willing to deploy a DoT/DoH server as a virtualized network function (VNF) with the appropriate functionality.

A secure DNS capable DNS forwarder of the present specification may be hosted on a home gateway or router, including a consumer-grade or enterprise-grade home gateway or router. This allows network security solutions, like SHP by MCAFEE, LLC or similar, to provide DNS-based filtering, parental controls, IoT firewall capabilities, and other security and privacy related functions on the router, while still preserving the user's privacy with respect to DNS lookups. The DNS forwarder on the home router also uses local secure DNS, while forwarding DNS queries to the upstream recursive resolver, thereby providing DNS privacy equivalent to internet-hosted or public DoH/DoT servers.

In on embodiment, unique fully-qualified domain name (FQDN) is assigned for each home gateway, which may be necessary in some cases to receive a certificate from a public certificate authority (CA) for the secure DNS server. In an illustrative embodiment, an automated certificate management environment (ACME) is used to get and manage a domain-validated certificate for an FQDN, or an IP-validated certificate for an IPv6 prefix assigned to the router. A cloud service may be used to perform ACME-based certificate issuance and management processes. This can help to reduce the load on the router. The certificate and key pairs, generated on the cloud service, can then be provided to the home routers using a secure communication channel.

Figure 2:
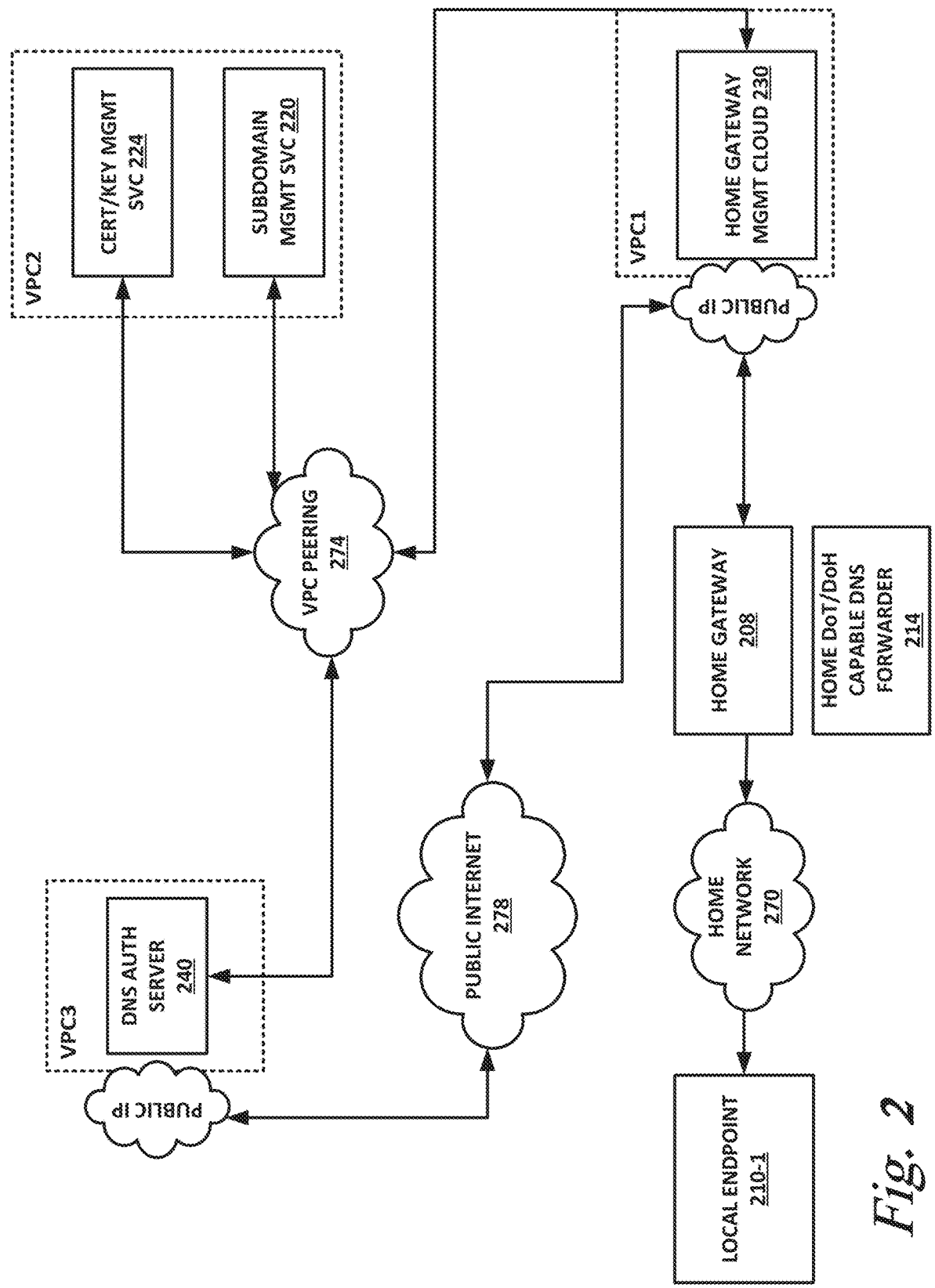
FIG. 2 is a block diagram of selected elements of a domain name resolution ecosystem.
Figure 3A:
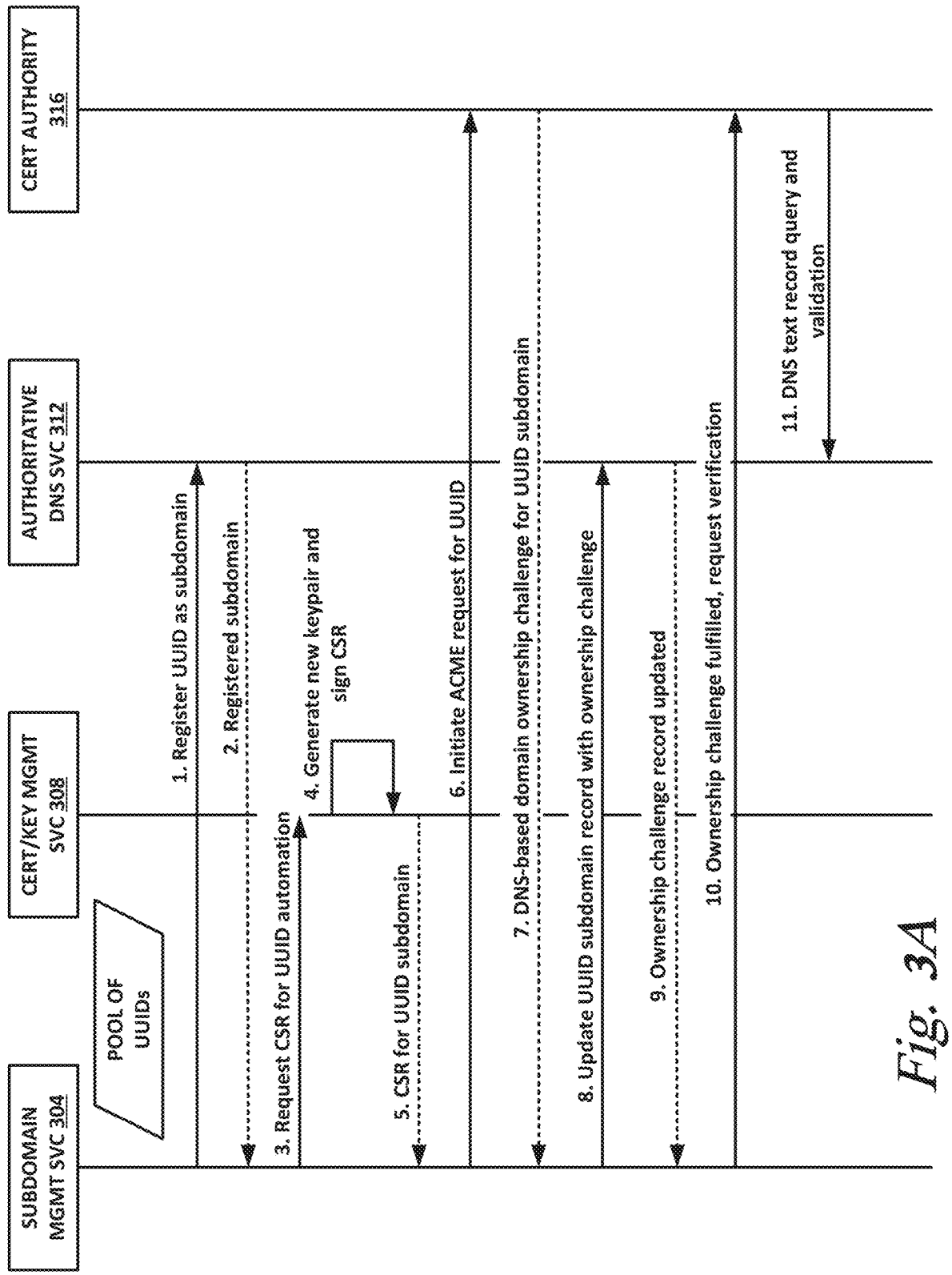
FIG. 3A-3B provide a signal flow diagram of selected operations in a secure DNS system.
Figure 3B:
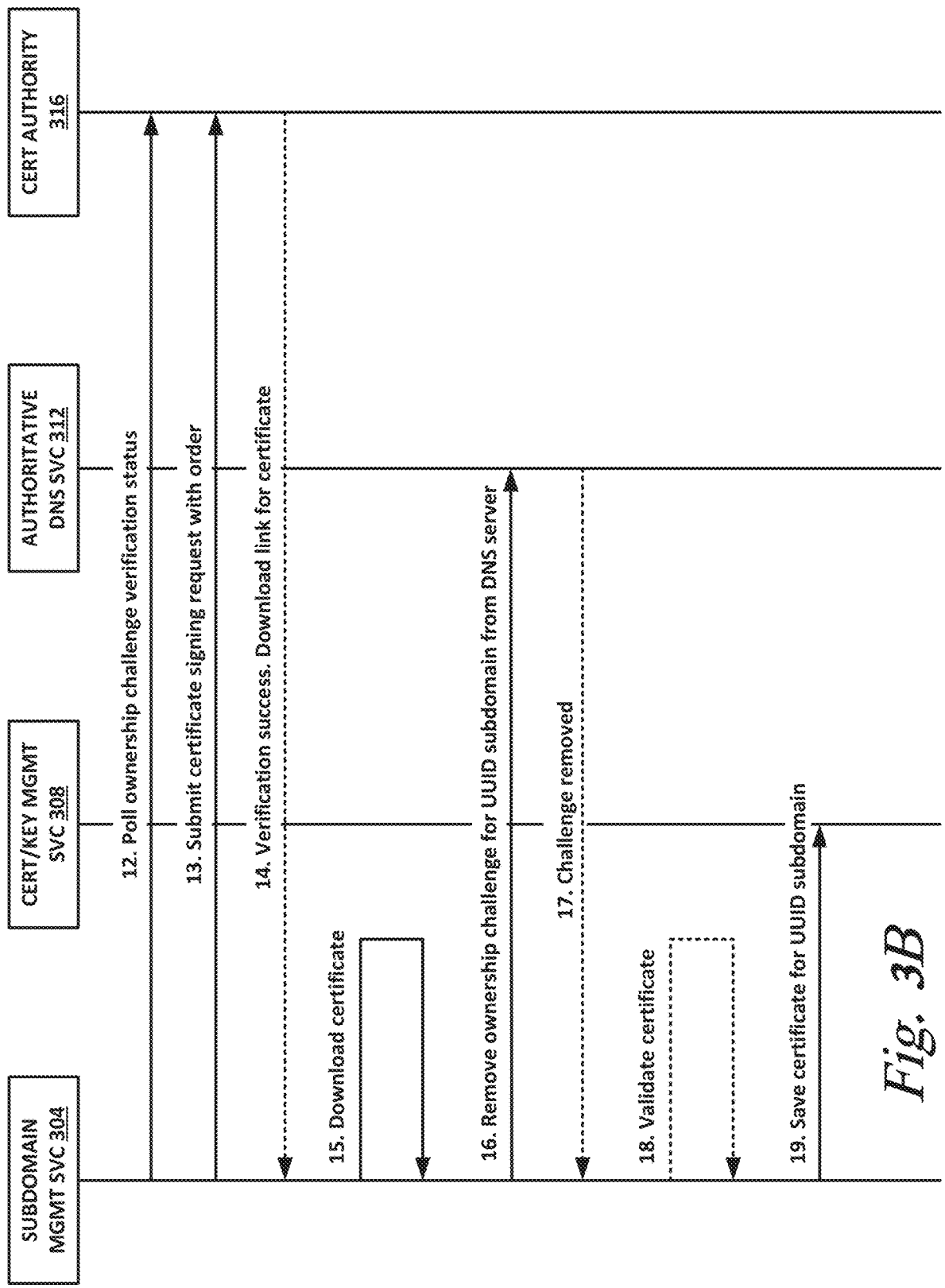
Figure 4:
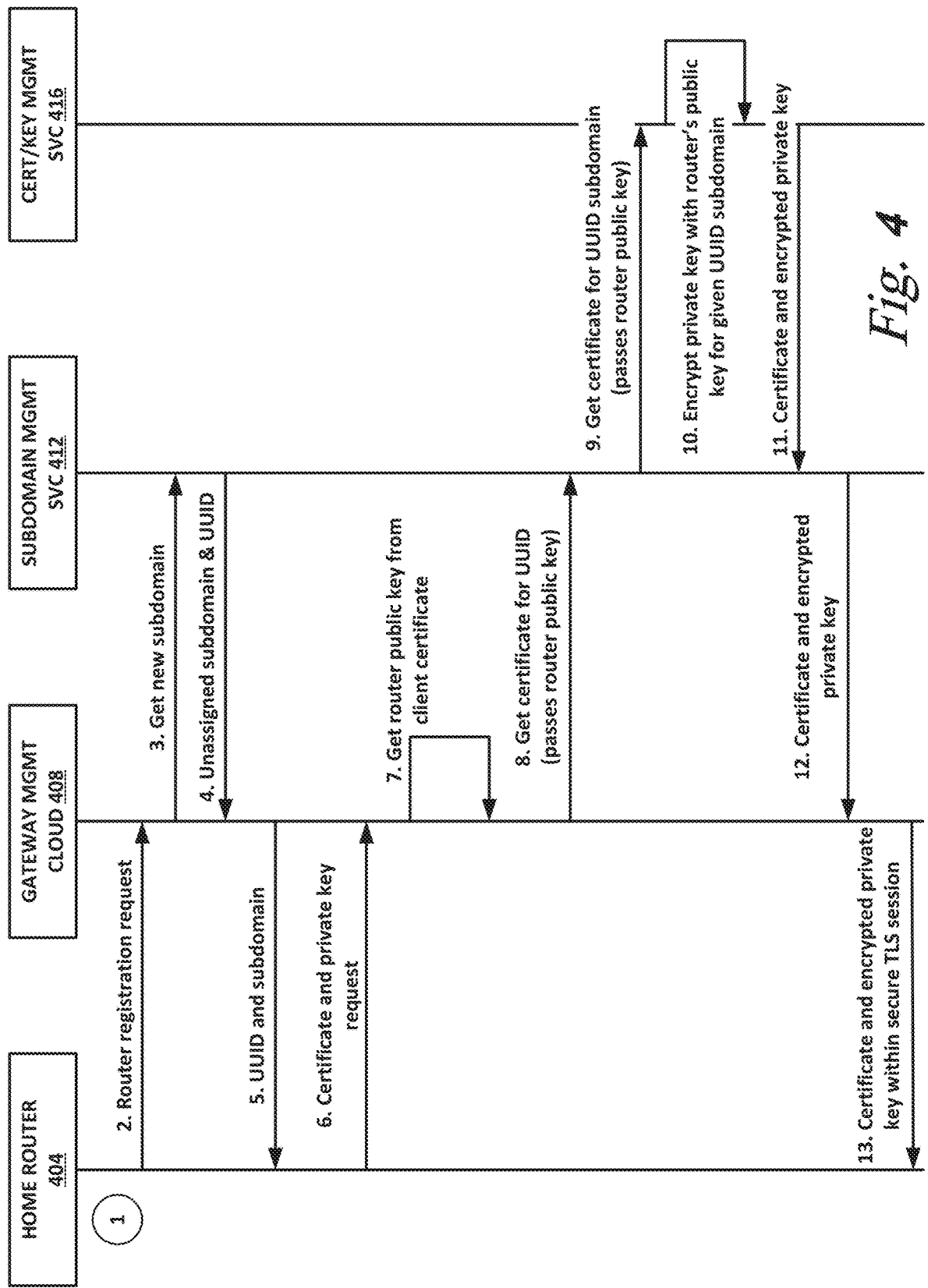
FIG. 4 provides a signal flow diagram of selected operations in a secure DNS system.

FIGS. 2-4 below illustrate such a system.

Alternative embodiments are also provided to address challenges that particularly arise with providing each home gateway a unique certificate from a CA. Those are addressed in FIGS. 5-8 below, in which an embodiment is disclosed in which a combination of delegated credentials and/or keyless SSL may be used to provide secure DNS services on a home gateway, without having to assign a unique public certificate to the home gateway.

A system and method for providing secure DNS using delegated credentials and keyless SSL will now be described with more particular reference to the attached figures. It should be noted that throughout the figures, certain reference numerals may be repeated to indicate that a particular device or block is referenced multiple times across several figures. In other cases, similar elements may be given new numbers in different figures. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be configured or adapted to provide privacy and security enabled DNS caching, according to the teachings of the present specification.

In the example of FIG. 1, security ecosystem 100 may be an enterprise, a government entity, a data center, a telecommunications provider, a "smart home" with computers, smart phones, and various IoT devices, a religious organization, a charity, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions. Some functions may be provided on client devices 110.

The term "home network" should be understood to refer to the function of the network as a trusted or home-based network. It does not necessarily mean that it is a consumer-grade network for an individual family, although it may be. Broadly, home network 170 may refer to any network, including an enterprise network, that user 120 regularly connects to, and in particular, a network having a gateway 108 that includes a caching DNS forwarder 114. Caching DNS forwarder 114 may be configured for use in embodiments of the present specification to provide secure DoH or DoT services to home network 170.

In this illustration, home network 170 is shown as a single network for simplicity, but in some embodiments, home network 170 may include any number of networks, such as one or more intranets connected to the internet. Home network 170 may also provide access to an external network, such as the internet, via external network 172. External network 172 may similarly be any suitable type of network.

Home network 170 may connect to the internet via gateway 108, which may be responsible, among other things, for providing a logical boundary between home network 170 and external network 172. Home network 170 may also provide home or enterprise gateway services, and may provide services such as dynamic host configuration protocol (DHCP), router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or VNFs.

Home network 170 may also include a number of discrete IoT devices. For example, home network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Remote DNS 160 may be operated, for example, by the ISP that services home network 170 and provides a connection between home network 170 and external network 172. Remote DNS server 160 may provide comprehensive DNS services, such as maintaining a mirror of a master domain name lookup table that is used to resolve domain names to IP addresses. In some cases, remote DNS 160 may provide encrypted or other secure DNS services, such as DoT and/or DoH.

Secure DNS services may require a trusted and encrypted connection between client device 110 and remote DNS 160. This can cause problems if caching DNS forwarder 114 is to cache DNS requests and resolve cached domain names to provide increased speed and efficiency for home network 170. Furthermore, caching DNS forwarder 114 may also need to provide certain domain name-based services, such as domain name-based filtering, ACLs, parental controls, and other similar DNS services.

In an encrypted communication, caching DNS forwarder 114 is an intermediary between remote DNS 160 and client device 110. Thus, for caching DNS forwarder 114 to provide its intended functionality, either client device 110 must forego secure DNS services, or caching DNS forwarder 114 must be configured to act as an authorized intermediary between remote DNS 160 and client device 110. The present specification illustrates a number of devices and methods that provide this intermediary functionality. In general terms, in an unsecured network, remote DNS 160 and client device 110 can be agnostic of the presence of a caching DNS forwarder 114. In those cases, client device 110 simply issues a domain name lookup request, and that request is serviced either by caching DNS forwarder 114 or by remote DNS 160. Client device 110 does not need to know or care which one services the request, or even that there is a two-tiered DNS structure.

On the other hand, in the case of secure DNS services, caching DNS forwarder 114 is an active participant in in the chain of trust.

Home network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 170, such as security software, security updates, network appliances, or similar. For example, MCAFEE, LLC provides a comprehensive suite of security services that may be used to protect home network 170 and the various devices connected to it.

It may be a goal of users 120 to successfully operate devices on home network 170 without interference from attacker 180, who may try to compromise the security or privacy of users 110. In enterprise contexts, attacker 180 may also want to commit industrial or other espionage, such as stealing classified or proprietary data, stealing identities, or gaining unauthorized access to enterprise resources.

Home network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Security services provider 190 may also have a valid domain certificate, and may have the ability to delegate credentials to home gateway 108, as described in FIGS. 5-8 below.

In the discussion below, FIGS. 2-4 illustrate aspects of an embodiment in which a router is provided with an FQDN, including its own certificate. FIGS. 5-8 illustrate aspects of an alternative embodiment, in which delegated credentials may be used for endpoints that support delegated credentials, or alternatively, keyless SSL may be used for endpoints that do not support delegated credentials.

FIG. 2 is a block diagram illustrating further selected aspects of a security ecosystem. In this configuration, a unique subdomain is assigned to each router by the security services provider, which may operate a security services cloud. The subdomains may be of the form:

<unique-router-identifier>.<primary-domain-name>.<top-level-domain>

The primary domain name can be any suitable domain name chosen by the security services provider. In this specification, the domain name "secureDNS.net" will be used as the primary domain name and the top level ".net" domain. This is provided as an illustrative example only, and it is noted that as of the date of this filing, secureDNS.net does not appear to be an active or operative domain name. If that domain name becomes active or operative in the future, there is no intention to imply or require a relationship between that domain name and the present specification.

The unique router identify portion of the FQDN is assigned to the individual router as a unique identifier. This could be, for example, a globally unique identifier (GUID) in the form of an IPv6 address, or other unique identifier. Furthermore, the unique identifier could be user selectable, similar to a username or handle, so that the user can assign a unique or preferred subdomain name to their own individual home router. Any other form of GUID can be used, wherein each router or a group of routers have their own individual GUID to distinguish them from one another.

A service such as ACME may then be used to automate the process of verification and certificate issuance for the subdomain. In an illustrative example, the process of verification and certificate issuance is automated and handled on a cloud service. Once a certificate is issued, it is provisioned to the router using a secure communication channel.

An illustrative architecture is illustrated in FIG. 2. A local endpoint 210-1 communicates via home network 270 with a home gateway 208. Home gateway 208 may include a home DoT/DoH-capable DNS forwarder 214 and may have assigned to it, for example by a security services provider, a GUID. This GUID is used to distinguish home gateway 208 from all other home gateways in the networking ecosystem. Home gateway 208 communicates via public internet 278 with a home gateway management cloud 230, which may have a public IP address to make it accessible via public internet 278. Virtual private cloud (VPC) peering 274 may be used to communicatively couple a first VPC (VPC1) that includes home gateway management cloud 230 with a second VPC (VPC2) and a third VPC (VPC3).

VPC2 includes a certificate and key pair management service 224 and a subdomain in DNS management service 220.

VPC3 includes a DNS authoritative server 240.

DNS authoritative server 240 configures and manages DNS records for all domains and their subdomains. Every time a new subdomain is created, a corresponding DNS record (e.g., TXT) may be added to authoritative DNS server 240. (Note that A, AAAA, and PTR records may not be necessary to create the certificate.) Advantageously, if the security services provider operates its own authoritative DNS server, then the security services provider can complete a dns-01 challenge presented by a CA to prove domain ownership during certificate issuance.

Subdomain and DNS management service 220 manages the process of creating a subdomain, adding corresponding DNS records into authoritative DNS server 240, and getting a new domain verified with a certificate for a subdomain. For each subdomain, subdomain management service 220 may use ACME to get a validated domain verified certificate signed by a CA. Subdomain management service 220 may also manage expiry and renewal of certificates.

During this process, subdomain management service 220 may interact with authoritative DNS server 240 to complete the DNS-based (dns-01) domain ownership challenge. It may also interact with certificate and key pair management service 224 for generating a public/private key pair and certificate signing request (CSR). These may be used to sign the ACME negotiations and to securely store the signed certificate. Finally, subdomain management service 220 may also keep track of certificate expiry and handle renewals, as well as handling revocations in case a router subscription expires.

Certificate and key pair management service 224 may be responsible for creating key pairs and CSRs for each subdomain. It may also store key pairs & signed certificates in a secure database.

Home gateway management cloud 230 may be responsible for onboarding new routers, provisioning the subdomain, and providing the key pair and certificate to the router. It may also manage router subscriptions.

It should be noted that the process of creating a new subdomain, configuring its DNS record, and getting a domain-validated certificate for that subdomain may take a nontrivial amount of time. For example, the time may be on the order of a few minutes to a few hours. Thus, subdomain management service 220 may optionally maintain a pool of pre-allocated subdomains and corresponding domain-validated certificates. These can be used for onboarding new routers, and then be revoked from those routers once provisioning of certificates for those routers is complete. For every new router subscription created on home gateway management cloud 230, home gateway management cloud 230 may request subdomain management service 220 to create a new subdomain and corresponding certificate. Subdomain management service 220 then issues a certificate and the corresponding key pair from the pool of pre-allocated subdomains, and updates the certificate status as provisioned. Home gateway management cloud 230 can then securely provision the certificate and key pair to the router using a secure communication mechanism.

Figure 9:
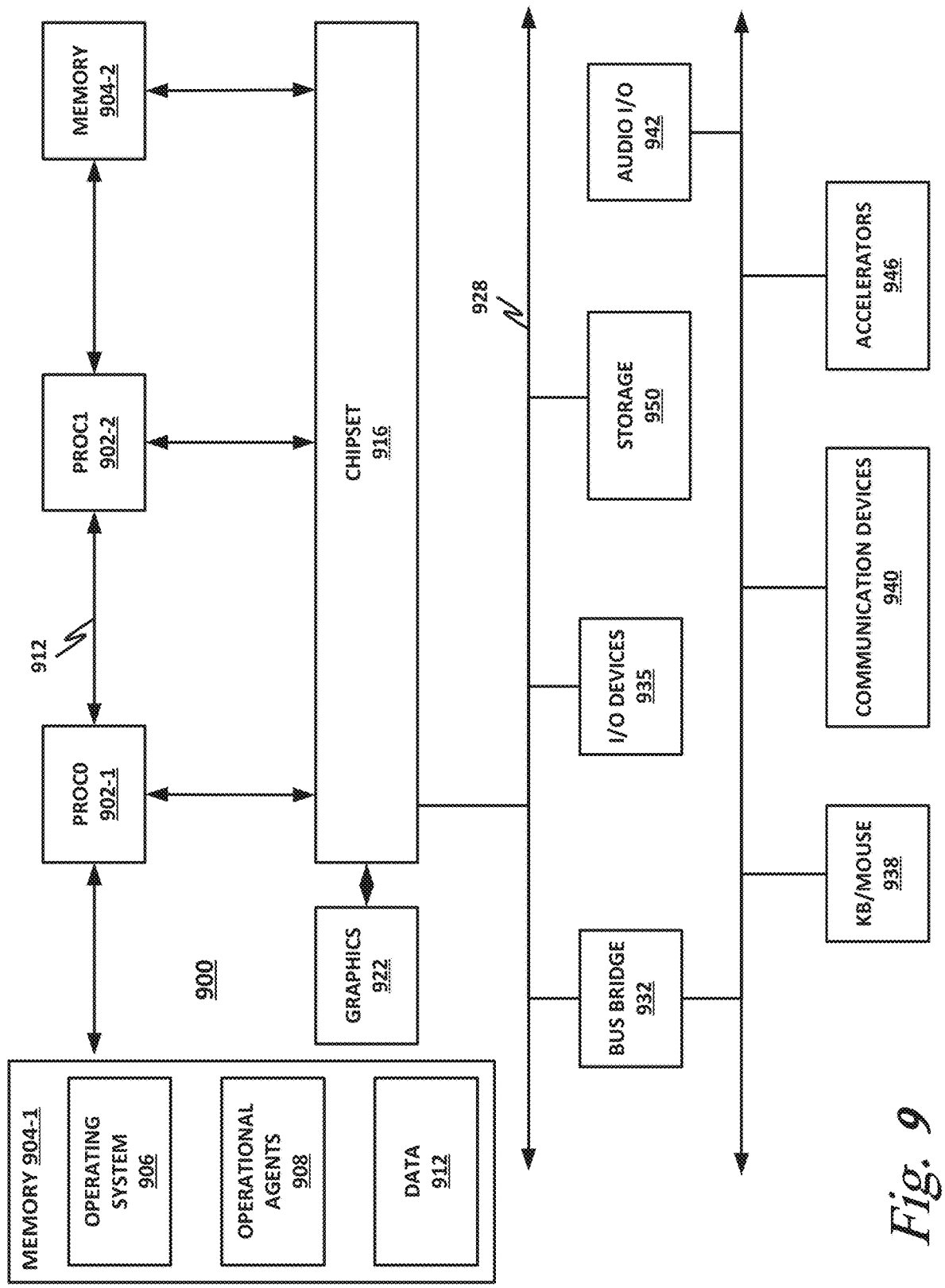
FIG. 9 is a block diagram of selected elements of a hardware platform.
Figure 10:
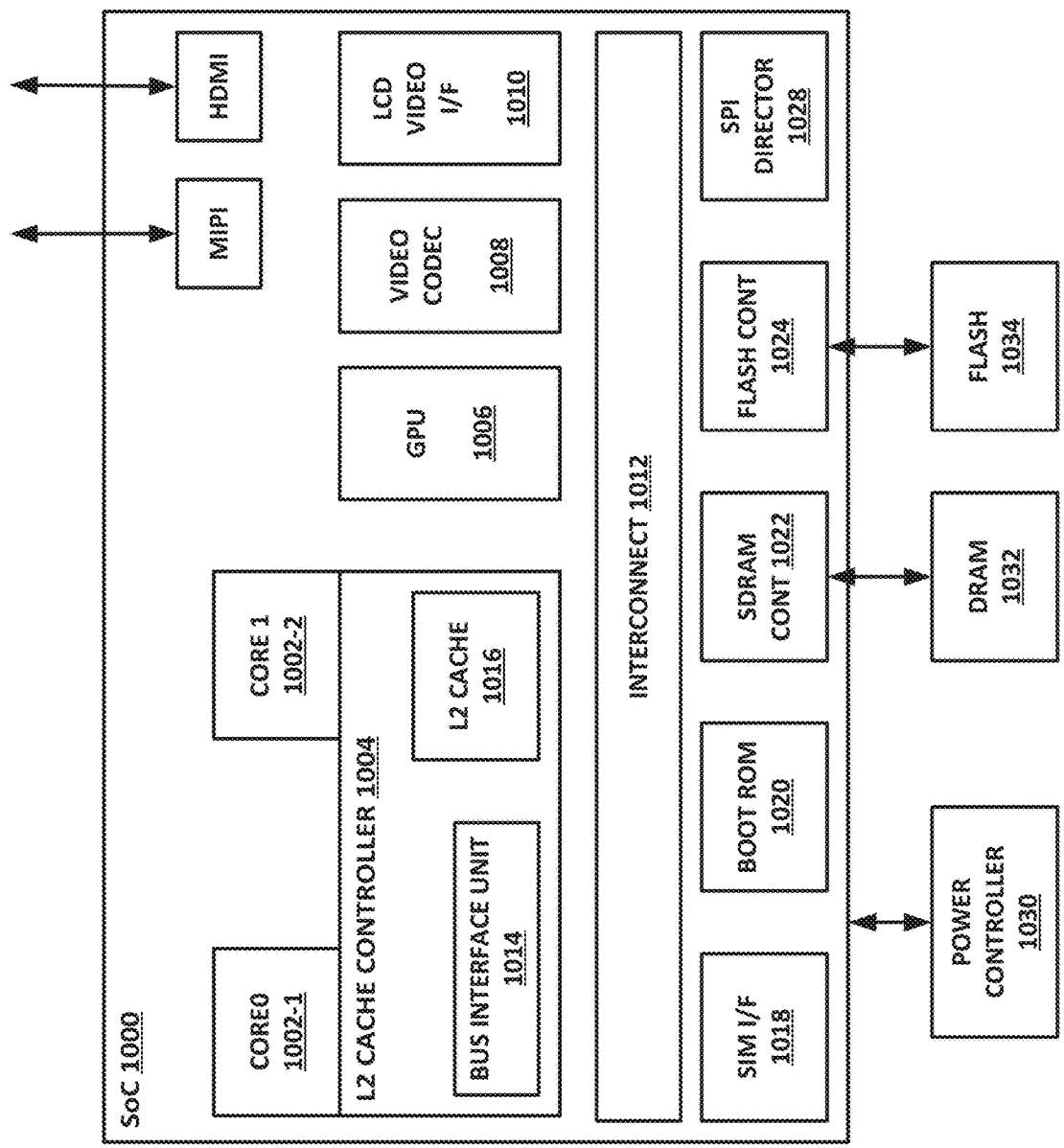
FIG. 10 is a block diagram of selected elements of a system-on-a-chip (SoC).

FIGS. 9-10 below provide illustrative hardware platforms that may embody some of the elements described herein, or those illustrated in FIG. 5 and FIG. 7. Some of the functions may be provided by software, which may include a secure provisioning algorithm for securely provisioning a certificate to the router. In at least some embodiments, this algorithm may be carried out on more than one device.

By way of illustration of such an algorithm, modern routers often come with a client identity certificate burned into the base firmware by the manufacturer. When a router onboards with home gateway management cloud 230, it may establish a secure sockets layer (SSL) connection with home gateway management cloud 230, wherein it authenticates itself to the management cloud using the identity certificate. Home gateway management cloud 230 may then extract a public key from the client identity certificate received from home gateway 208 and send it to subdomain management service 220. Home gateway management cloud 230 requests from subdomain management service 220 a new domain-validated certificate and private key.

Subdomain management service 220 passes the received public key to certificate/key management service 224, and requests a certificate and private key for the subdomain. Certificate and key management service 224 encrypts the private key with the received public key and sends the domain-validated certificate, along with an encrypted private key backup, to home gateway management cloud 230 via subdomain management service 220.

Home gateway management cloud 230 may send the encrypted private key and certificate over to home gateway 208, using the secure communication channel established earlier.

The certificate renewal process is similar to that of the certificate issuing, and may also be managed by subdomain management service 220. Subdomain management service 220 may notify home gateway management cloud 230 as soon as the certificate is renewed. Home gateway management cloud 230 then provisions the renewed certificate to home gateway 208 over the secure communication channel, as discussed above.

Finally, the provisioned subdomain and certificate may be used to run a DoT or DoH-capable DNS forwarder on the local area network (LAN) interface of home gateway 208. In this configuration, subdomain management service 220 and certificate/key management service 224 may be provided by the security services provider, and thus do not require any infrastructural changes on the part of the ISP network. However, if the ISP network wishes, it can also host and manage a subdomain management service 220 and/or certificate/key management service 224.

Because certificate issuance is handled on the cloud, this mechanism requires shared keys with home gateway 208 over the wire. In general, sharing private keys over the wire is considered suboptimal security practice. However, in this configuration, the wire is secured by SSL, and the key is additionally encrypted by a public key from home gateway 208. Thus, a high level of security is provided even while sharing keys over the wire.

An alternative approach is to run an ACME client on home gateway 208, and then home gateway management cloud 230 may pass the universal unique identifier (UUID) subdomain to home gateway 208. The ACME client then generates the key pair locally on home gateway 208 and interacts with the CA to get a certificate for the subdomain. During this process, the ACME client may interact with an authoritative DNS server 240 on the cloud to fulfill the domain ownership challenges. This approach avoids sharing private keys over the wire, in embodiments where such avoidance is desired.

FIGS. 3a-3b and FIG. 4 respectively provide signal flow diagrams illustrating algorithms for management of subdomain certificates on the cloud, and provisioning of subdomain certificates to home routers. Aspects of these algorithms are described above in text format, but are illustrated here in signal flow diagram format for additional clarification.

FIGS. 3a and 3b are a signal flow diagram illustrating management of subdomain certificates in the cloud. In FIGS. 3a and 3b, there is illustrated a subdomain management service 304, a certificate key management service 308, an authoritative DNS service 312, and a CA 316.

It is noted initially that subdomain management service 304 maintains a pool of UUIDs that can be provisioned out to routers or home gateways. These UUIDs may be globally unique, or at least globally pseudo-unique.

In operation 1, subdomain management service 304 registers the UUID as a subdomain with authoritative DNS service 312.

In operation 2, authoritative DNS service 312 returns the registered subdomain to subdomain management service 304.

In operation 3, subdomain management service 304 requests a CSR for UUID automation from certificate/key management service 308.

In operation 4, internally to certificate and key management service 308, a new key pair and signed CSR is generated.

In operation 5, certificate and key management service 308 returns the CSR for the UUID subdomain to subdomain management service 304.

In operation 6, subdomain management service 304 initiates an ACME request for the UUID with an order to CA 316.

In operation 7, CA 316 sends a DNS-based domain ownership challenge for the UUID subdomain, which is received by subdomain management service 304 because it owns the UUID-based subdomain.

In operation 8, subdomain management service 304 updates the UUID subdomain record with the ownership challenge to authoritative DNS service 312.

In operation 9, authoritative DNS service 312 returns to subdomain management service 304 a notification that the ownership challenge record has been updated.

In operation 10, subdomain management service 304 fulfills the ownership challenge to CA 316 and requests verification.

In operation 11, CA 316 sends to authoritative DNS service 312 a DNS text record query and validation.

In operation 12, subdomain management service 304 polls the ownership challenge verification status by periodically querying CA 316.

In operation 13, subdomain management service 304 submits a certificate signing request (CSR) with the order to CA 316.

In operation 14, once the verification has been fulfilled, CA 316 sends a verification success message to subdomain management service 304. Subdomain management service 304 then sends the signed CSR with the order to CA 316. CA 316 then sends a download link for the certificate.

In operation 15, subdomain management service 304 downloads the certificate from CA 316.

In operation 16, subdomain management service 304 instructs authoritative DNS service 312 to remove the ownership challenge for the UUID subdomain from the DNS server.

In operation 17, authoritative DNS service 312 notifies subdomain management service 304 that the challenge has been removed.

In operation 18, subdomain management service 304 validates the certificate.

In operation 19, subdomain management service 304 saves the certificate for UUID subdomain to certificate and key management service 308.

As noted above, FIG. 4 is a signal flow diagram illustrating provisioning of subdomain certificates to home routers or home gateways.

At operation 1, during onboarding, the router or home gateway enrolls itself with gateway management cloud 408 and requests a certificate and private key over a secure TLS connection. This includes operations 2 through 14.

In operation 2, home router 404 sends a registration request to gateway management cloud 408.

In operation 3, gateway management cloud 408 sends a request for a new subdomain from subdomain management service 412.

In operation 4, subdomain management service 412 returns an unassigned subdomain and UUID to gateway management cloud 408.

In operation 5, gateway management cloud 408 provides the UUID and subdomain to home router 404.

In operation 6, home router 404 sends a certificate and private key request to gateway management cloud 408.

In operation 7, gateway management cloud 408 internally extracts the router public key from the client certificate.

In operation 8, gateway management cloud 408 requests a certificate for the UUID, and passes the router public key to subdomain management service 412.

In operation 9, subdomain management service 412 requests to get the certificate for the UUID subdomain from certificate/key management service 416, and passes the router public key to certificate and key management service 416.

In operation 10, internally to certificate and key management service 416, the private key is encrypted with the router's public key for the giving UUID subdomain.

In operation 11, certificate and key management service 416 provides the certificate and encrypted private key to subdomain management service 412.

In operation 12, subdomain management service 412 sends the certificate and encrypted private key to gateway management cloud 408.

In operation 13, the certificate and encrypted private key are provided within the secure TLS session from gateway management cloud 408 to home router 404.

One challenge with the ecosystem illustrated in FIGS. 2-4 is scalability. In some cases, it can be cost-prohibitive to have a CA provide unique certificates to millions of home gateways with their own unique FQDNs. The security services provider and/or ISP may be required to pay for each certificate, and even with large-volume discounts, the cost can become a barrier to implementing the system.

Thus, while the system of FIGS. 2-4 is viable on a technical level, in some cases it may be supplemented or supplanted by a system that instead uses a combination of one or both of delegated credentials, or keyless SSL.

FIGS. 3A-4 contemplate a scenario wherein key pairs and certificates are generated in the cloud for every router. There are also scenarios and security considerations that may drive a preference to generate the key pair on the router. In that case, only the signed CSR is sent to the cloud for creating certificates. In this embodiment, the private key never leaves the router (ensuring security) and the certificate creation operation is delegated to cloud. This may reduce the overhead on constrained router devices.

Figure 5:
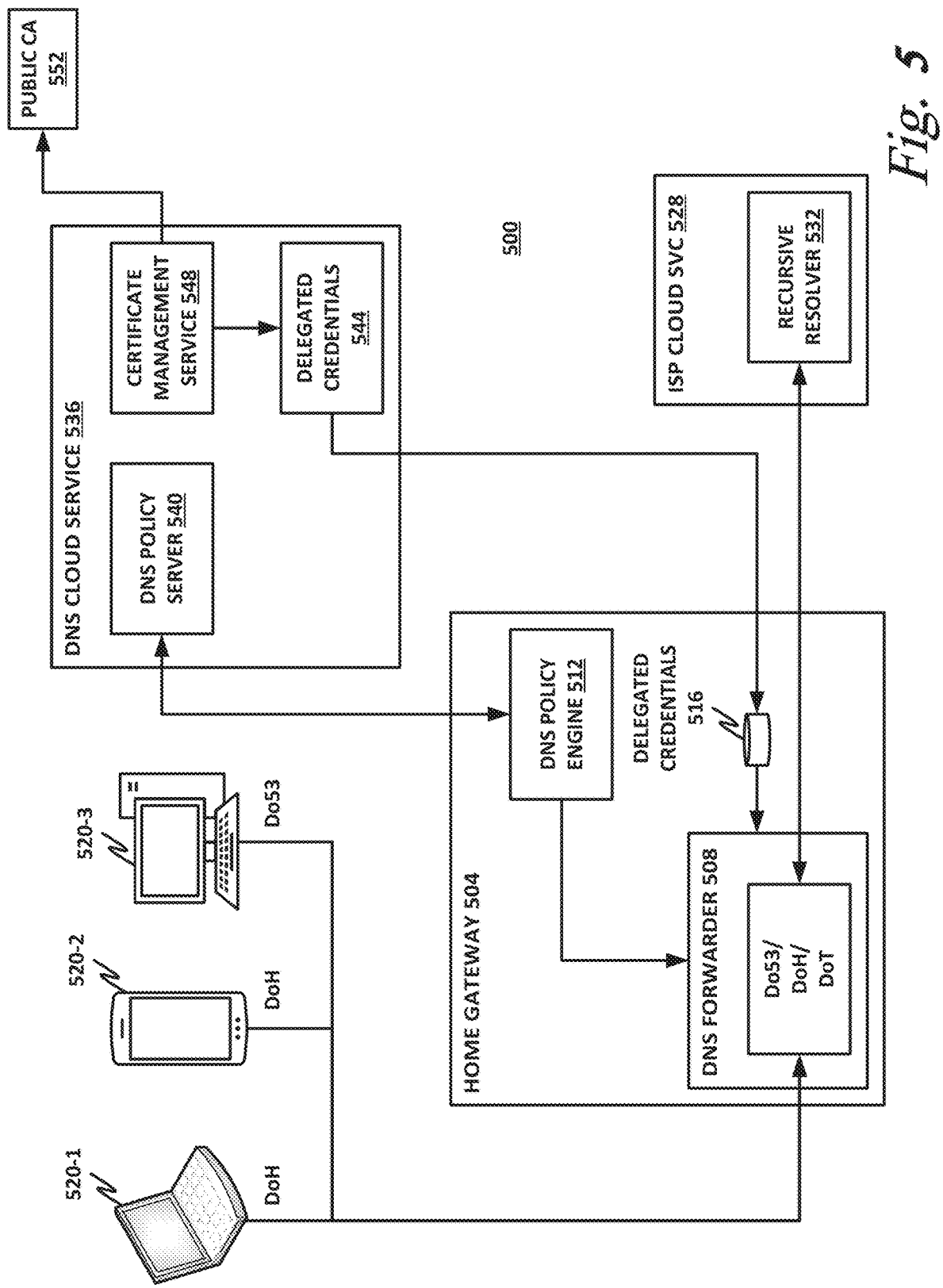
FIG. 5 is a block diagram of selected elements of a domain name resolution ecosystem.

FIG. 5 is a block diagram of selected elements of a computer network 500. Computer network 500 is designed to address certain impracticalities in some embodiments of secure DNS. For example, a current IETF working group draft defines a mechanism to bootstrap endpoint devices with the authentication domain name (ADN) of a local network's DoT/DoH server. The mechanism proposed in the draft requires the DNS server to have a public domain name, and the DNS server certificate must be signed by a public CA. A current proposal includes a mechanism for deploying a DoT/DoH-capable DNS forwarder using a unique public certificate on home routers, SMB networks, and branch offices in enterprise networks.

One aspect of this proposed standard is the use of automated certificate management environment (ACME) based scalable cloud services to get and manage a domain-validated certificate for a unique FQDN assigned to each home or server message block (SMB) network router or to a branch office in an enterprise network with direct internet access (e.g., SD-WAN).

This mechanism of generating millions of certificates has a dependency on a CA, which incurs support costs associated with these certificates and also causes latency issues when generating and renewing certificates. Thus, while this solution is workable in some embodiments, in other embodiments, such as large-scale public use, it may be impractical.

Thus, network 500 at FIG. 5 provides a solution to reduce the dependency on the CA and minimize the support costs. This also ensures faster deployment of DoT/DoH-capable DNS forwarders in the home, SMB, and enterprise networks.

Certificate management is an important aspect of network 500. Hosting a home gateway 504 with a DNS forwarder 508 that is capable of providing secure DNS services, such as DoH or DoT, may require a domain name and an SSL certificate on home gateway 504. However, it may not be practical to assign a unique FQDN and an associated public SSL certificate signed by public CA 552 for each instance of home gateway 504.

To reduce the cost, latency, and dependency on public CA 552, network 500 provides an optimization that uses a combination of delegated credentials and keyless SSL for creating and managing certificates at scale. This means that large numbers, such as millions of home gateways 504, can be deployed in the network without incurring the cost of assigning a public certificate to each home gateway 504. Rather, home gateway 504 may dynamically identify if connected endpoint devices 520 (e.g., 520-1, 520-2, or 520-3) support delegated credentials. If an endpoint 520 supports delegated credentials, then delegated credentials may be used for establishing a DoH/DoT connection. For example, if endpoint 520-1 supports delegated credentials, then delegated credentials may be used for secure DNS transactions with endpoint 520-1. However, if endpoint 520-2 does not support delegated credentials, then home gateway 504 may enforce the use of keyless SSL to establish the DoH/DoT connection.

More particularly, the delegated credentials may be used to establish the DoH/DoT session between the endpoint and the gateway. The DNS queries may then be secured using the session keys generated during the TLS handshake process. Thus, when it is said that the transaction is secured using the delegated credentials, this is stated broadly to encompass the full process.

Similarly, in the case of keyless SSL, the keyless SSL is used during a TLS handshake to establish a secure communication channel between endpoint and the gateway. The session keys that are exchanged during this handshake are used to encrypt individual packets, and similarly, when it is said that the transaction is encrypted via keyless SSL, this should be understood to encompass the procedure broadly.

Both the delegated credentials in keyless SSL approaches eliminate the need of creating millions of certificates signed by public CA 552. Furthermore, the reduced dependence on public CA 552 helps to ease scaling and adoption of the solution by partner ISPs, such as ISP cloud service 528.

Network 500 realizes advantages over solutions where a unique name and domain-validated certificate are required for each home gateway 504. Network 500 eliminates the need of having a unique FQDN and corresponding domain-validated certificate for each home gateway 504. This drastically reduces the cost of partnering with public CA 552.

The embodiment disclosed in FIG. 5 mitigates risks posed by evolving DNS standards, including secure DNS standards such as DoH and DoT. For example, a vendor of home gateway 504 (e.g., security services provider 190 of FIG. 1) may partner with an ISP to deploy a secure DNS capable DNS forwarder on customer premises equipment (CPE) or home gateways such as home gateway 504. In some existing solutions, ACME is used to provision FQDNs and domain-validated certificates to millions of home gateways and CPE. However, the ACME-based certification and renewal process is asynchronous and requires multiple back-and-forth transactions with public CA 552 to prove domain ownership. This asynchronous back-and-forth communication may cause latencies, especially at scale where millions of certificates are being provisioned.

To alleviate this issue, network 500 works without tight integration between public CA 552 and home gateway 504. However, network 500 still provides the necessary mechanism to enable hosting a secure DNS forwarder on home gateway 504.

To minimize dependency on public CA 552 and reduce the associated costs, home gateway 504 may use a combination of delegated credentials and keyless SSL. Delegated credentials was jointly proposed by Mozilla, Cloudflare, and Facebook. Keyless SSL was primarily proposed and developed by content delivery networks (CDNs) like Akamai and Cloudflare. Embodiments of home gateway 504 may use either delegated credentials or keyless SSL, depending on whether the endpoint device supports delegated credentials. In some embodiments, home gateway 504 has a preference for delegated credentials and provides keyless SSL only to devices that do not support delegated credentials.

In an illustrative embodiment, DNS cloud service 536 may be operated by a vendor, such as security services provider 190 of FIG. 1 or similar. The operator of DNS cloud service 536 may receive a unique FQDN for its encrypted DNS services and receive a corresponding domain-validated (DV) certificate signed by public CA 552. The private key for this certificate may be stored on a secure storage within DNS cloud service 536. During bootstrapping, each home gateway 504 enrolls itself with DNS cloud service 536 by using enrollment over secure transport (EST) to get an identity certificate. For example, certificate management service 548 may receive its own DV certificate from public CA 552 and then create delegated credentials 544. Home gateway 504 then engages in EST with DNS cloud service 536 and receives an identity certificate. This identity certificate may be used to establish mutually authenticated secure communication channels between home gateway 504 and DNS cloud service 536.

In an example, DNS cloud service 536 may provide a DNS policy server 540, which may provide cloud-based DNS policies. These can be used in some cases to populate or supplement DNS policy engine 512 of home gateway 504. This may include DNS policies associated with a particular enterprise, user account, or other.

Home gateway 504 may then generate a unique key pair to be used to get the delegated credentials. This unique key pair may have a relatively short TTL, such as seven days, and thus the key pair is renewed within seven days.

DNS cloud service 536 hosts certificate management service 548. Certificate management service 548 is responsible for authenticating home gateway 504 using the identity certificate and then signs a delegated credential 544 using the DV certificate of DNS cloud service 536. Home gateway 504 may send the delegated credentials signing report to certificate management service 548 on DNS cloud service 536. The delegated credential may be a short-lived key that the certificate's owner has delegated to another entity for use in TLS. This short-lived key may have a much shorter lifespan than a DV certificate for an FQDN. For example, the maximum lifespan or validity of a delegated credential may be seven days.

Delegated credentials 544 contain the public key, a signature verification algorithm, and an expiry time. The data structure may be signed by the leaf certificate, thereby the delegated credentials to the DV certificate of DNS cloud service 536. This DV certificate was created for encrypted DNS services provided by DNS cloud service 536.

Certificate management service 548 may sign delegated credentials 544 using the private encrypted key of DNS cloud service 536, the private encrypted key of the DV certificate of DNS cloud service 536. The signed delegated credentials may then be securely provisioned by DNS cloud service 536 to home gateway 504.

Home gateway 504 may continue refreshing its key pair and request new delegated credentials from certificate management service 548, such as once every seven days, when its short-lived certificate expires.

In operation, home gateway 504 may have a DNS policy engine 512, which may include policies such as blocking, allowing, caching, or otherwise managing certain domain names. DNS policy engine 512 can act as a traditional home gateway-based DNS management system. DNS forwarder 508 can provide various DNS services, including legacy Do53 or encrypted and secure DNS, such as DoH and DoT. DNS forwarder 508 may have a policy to provide legacy Do53 only to certain endpoints that do not support secure DNS, such as DoH or DoT. As in a traditional home gateway, DNS forwarder 508 may be a caching DNS server, which does not have a full mirror of the entire DNS directory. Rather, DNS forwarder 508 may query recursive resolver 532 of ISP cloud service 528 for domain names that it does not have currently cached. Once the domain name has been resolved, DNS forwarder 508 may cache the domain name with a time to live, such as 24 hours or similar.

When an endpoint device 520 discovers the local DNS forwarder 508, it may operate according to the discovery mechanism disclosed above. This may be in accordance with the current IETF draft for secure DNS services on a home gateway. This draft has strong support from OS vendors, browser vendors, and ISPs.

When an endpoint 520 discovers home gateway 500, including DNS forwarder 508, DNS forwarder 508 may determine whether endpoint 520 supports secure DNS, and whether it supports delegated credentials for its cryptographic operations. For example, as illustrated, endpoint 520-1 supports DoH, and may or may not support delegated credentials for DoH. Endpoint 520-2 supports DoT, and may or may not support delegated credentials for DoT. Endpoint 520-3 supports only legacy Do53, and thus cannot use delegated credentials. For example, endpoint 520-3 may be an older device, or an IoT device that is not secure DNS capable, and thus DNS forwarder 508 may provide legacy unencrypted DNS services to endpoint 520-3.

If an endpoint 520 supports delegated credentials, then delegated credentials 516 will be used to secure DNS transactions with the endpoint 520. For example, an endpoint 520 may indicate that it supports delegated credentials for secure DNS forwarders on routers by indicating a new delegated_credentials extension in the CLIENT HELLO that is exchanged when the DNS transaction begins.

Figure 6:
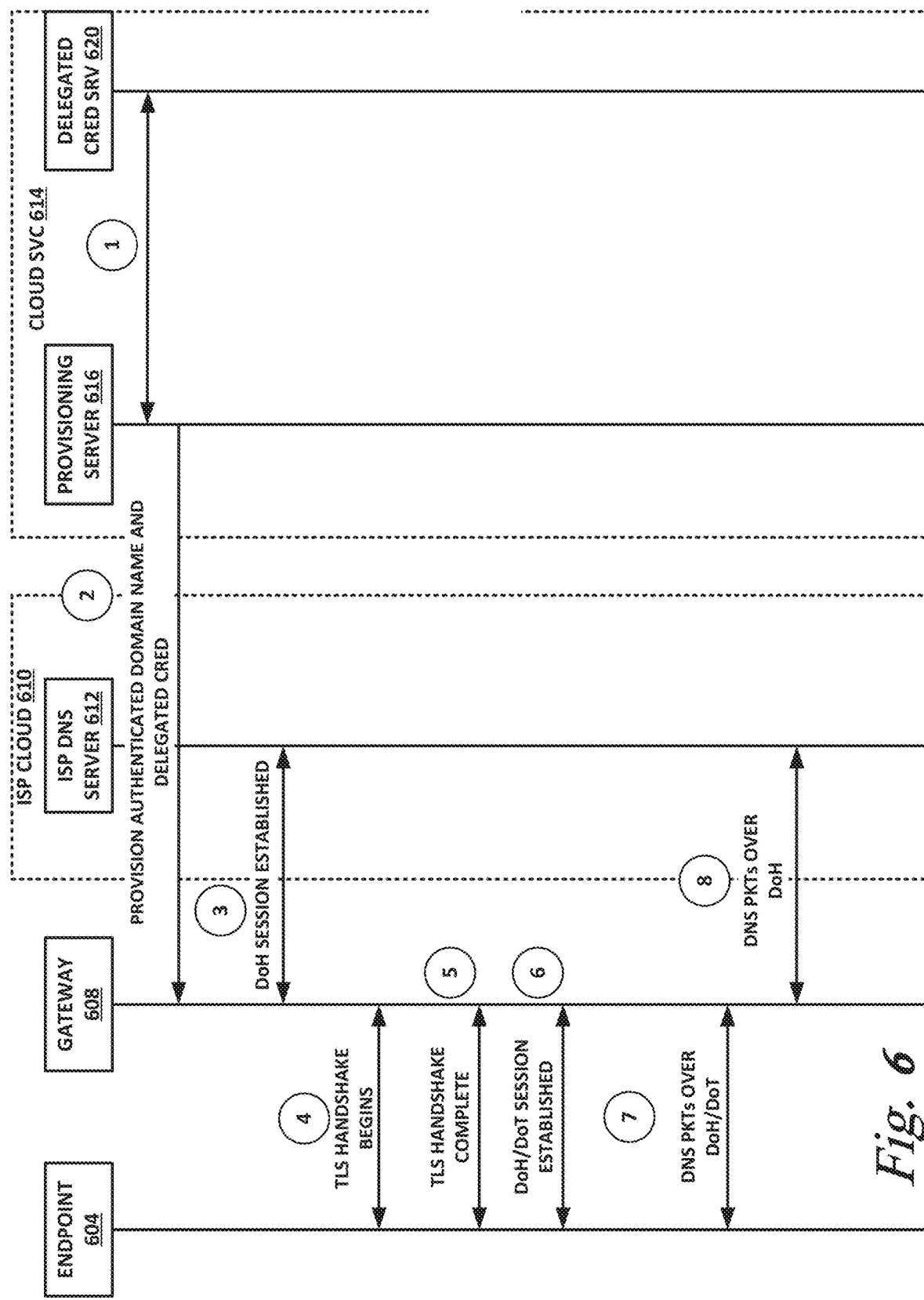
FIG. 6 provides a signal flow diagram of selected operations in a secure DNS system.

If endpoint 520 supports delegated credentials, then transactions may proceed as illustrated in FIG. 5 and in the signal flow diagram of FIG. 6. On the other hand, if an endpoint does not support delegated credentials, then transactions may proceed with keyless SSL as illustrated in FIGS. 7 and 8.

In the case of support for delegated credentials, FIG. 6 provides a signal flow diagram of providing secure DNS services via delegated credentials.

FIG. 6 is a signal flow diagram illustrating transactions between endpoint 604, gateway 608, ISP DNS server 612, which is part of ISP cloud 610, provisioning server 616, and delegated credential service 620, both of which are part of cloud service 614.

At operation 1, delegated credential service 620 creates delegated credentials for each router that it services. These delegated credentials are provided to provisioning server 616.

At operation 2, provisioning server 616 provisions a domain name and delegated credentials to home gateway 608.

In operation 3, home gateway 608 establishes a DoH session with ISP DNS server 612 of ISP cloud 610.

At operation 4, endpoint 604 begins a TLS handshake with gateway 608.

At operation 5, the TLS handshake between endpoint 604 and gateway 608 completes.

At operation 6, a secure DNS session, such as DoH or DoT, is established between endpoint 604 and gateway 608 using the delegated credentials provisioned to gateway 608.

At operation 7, endpoint 604 begins a secure DNS transaction with gateway 608 by sending DoH or DoT packets to gateway 608. If gateway 608 can resolve these DNS queries using cached queries, then responses are returned directly to endpoint 604. On the other hand, if gateway 608 cannot resolve the queries via cached DNS entries, then in operation eight, gateway 608 provides DNS packets over DoH to ISP DNS server 612 and receives the appropriate DNS responses.

DNS forwarder 508, on receiving the delegated credentials extension from the endpoint, composes the TLS certificate verify and certificate messages as usual. It may also include the delegated credentials received from DNS cloud service 536 as an extension in the certificate entry of its end-entity certificate.

On receiving the delegated credentials, an endpoint 520 verifies the delegated credentials as described in the proposed standard for delegated credentials.

Figure 7:
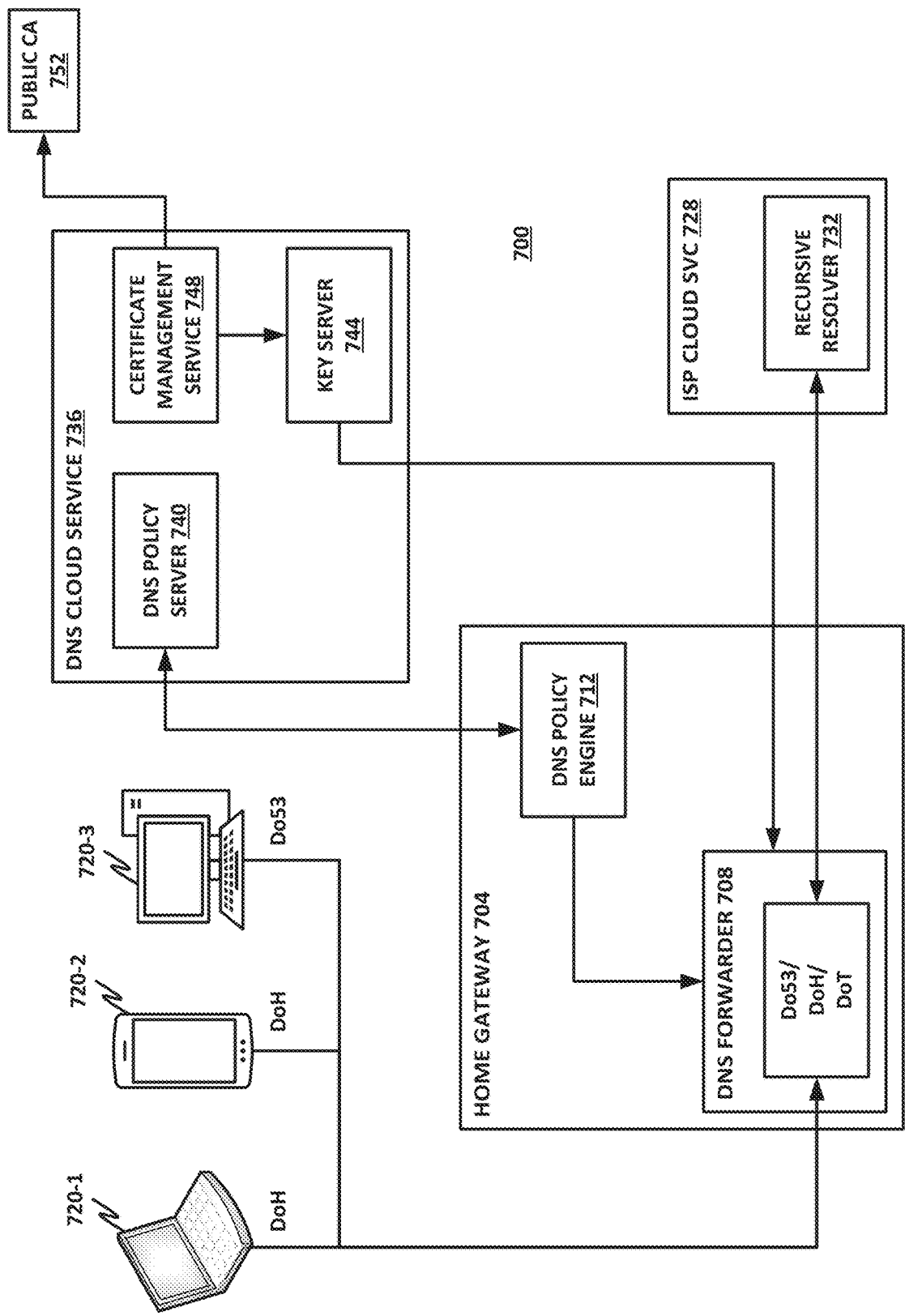
FIG. 7 is a block diagram of selected elements of a domain name resolution ecosystem.
Figure 8:
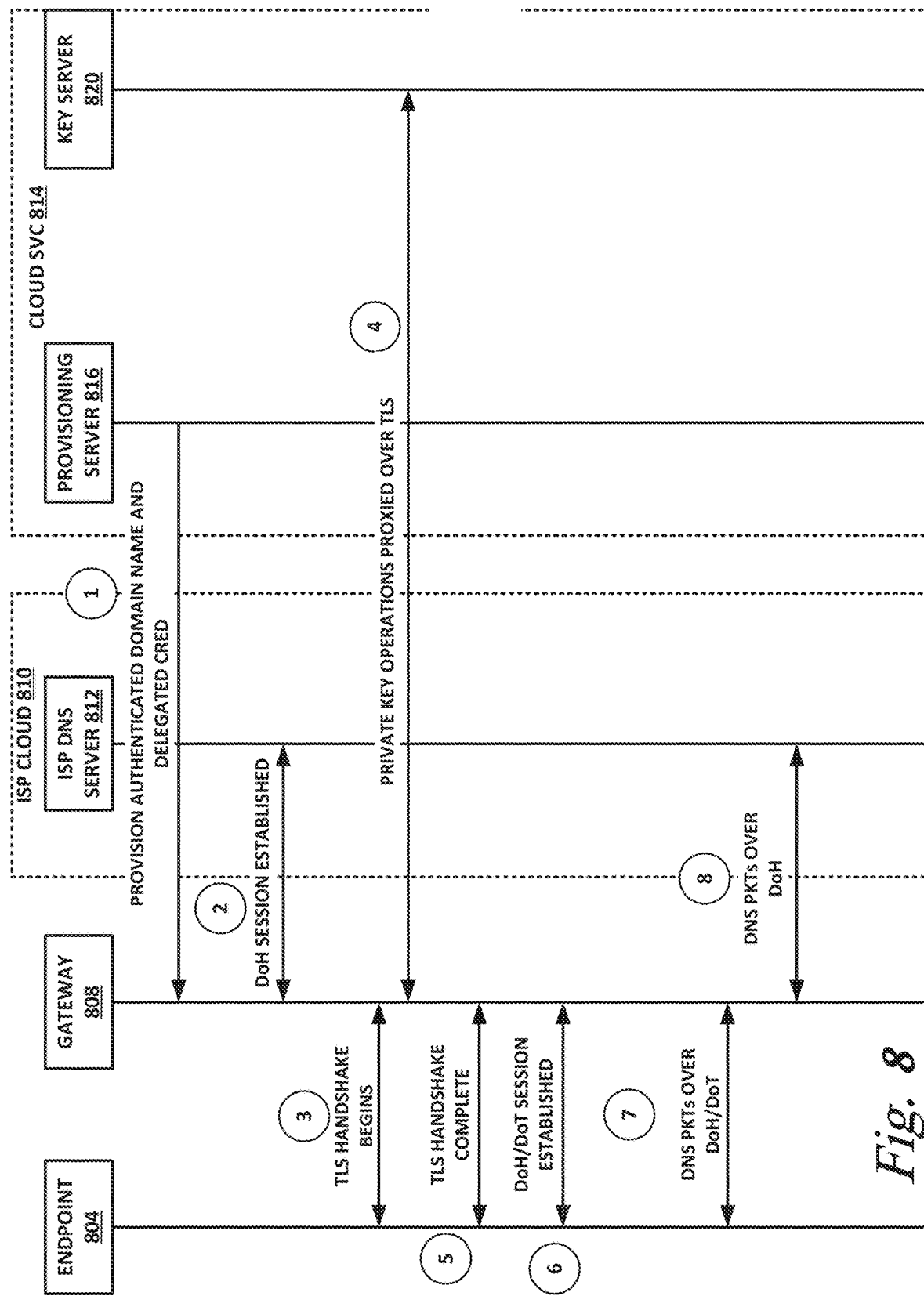
FIG. 8 provide a signal flow diagram of selected operations in a secure DNS system.

FIG. 7 is a block diagram of selected elements of network 700. Network 700 is similar to network 500 of FIG. 5, and indeed, in at least some embodiments, network 700 and network 500 may be the same network. However, network 700 is illustrated here as a separate network to illustrate the differences in operation, in particular with respect to keyless SSL.

As with network 500, network 700 includes a home gateway 704, including a DNS policy engine 712 and a DNS forwarder 708. Home gateway 704 communicatively couples to endpoints 720-1, 720-2, and 720-3. Home gateway 704 also communicatively couples to a DNS cloud service 736, which includes a DNS policy server 740, and a certificate management service 748. Instead of delegated credentials, DNS cloud service 736 provides a key server 744. DNS cloud server 736 has an FQDN and receives a DV certificate from public CA 752. Furthermore, as in the case of FIG. 5, DNS forwarder 708 forwards to recursive resolver 732 of ISP cloud service 728 any DNS queries that cannot be handled via cached entries of DNS forwarder 708. As described above, the home gateway 704 may have a preference for providing delegated credentials instead of keyless SSL. In particular, home gateway 704 may provide delegated credentials, as in FIG. 5, for any endpoint 720 that supports delegated credentials. Indeed, if an endpoint 720 is found to be operating software, such as a browser or operating system, that has a version that supports delegated credentials, home gateway 704 may send a message to the endpoint 720 recommending that endpoint 720 update its software to a version that provides delegated credentials support.

In this embodiment, if delegated credentials support is not available, then home gateway 704 may prefer keyless SSL to providing legacy unencrypted Do53 DNS services. If an endpoint 720 does not report delegated credentials, then home gateway 704 may create a mutually authenticated TLS session using a keyless SSL service running on home gateway 704. Home gateway 704 may use the TLS session to offload cryptographic operations over to a keyless SSL service. The keyless SSL service computes a pre-master secret (for RSA handshake) or DH parameters (for Diffie-Hellman handshake) and send those back to home gateway 704. Home gateway 704 uses the cryptographic parameters received from keyless SSL service 744 to create a DoH/DoT session with an endpoint 720.

As described above, if the current software stack on an endpoint 720 does not support delegated credentials but an updated version is available that does support delegated credentials, home gateway 704 may recommend to a home administrator to upgrade the software stack on the endpoints for better performance.

Both delegated credentials and keyless SSL eliminate the need for creating and managing DV certificates for each instance of a home gateway 504 or 704. This helps to reduce the dependency on a public CA, thereby reducing cost and efficiency. In at least some embodiments, the delegated credentials approach is preferred over the keyless SSL approach because it does not require an additional round trip latency for cryptographic operations. However, there may also be embodiments that prefer keyless SSL over delegated credentials.

FIG. 8 is a signal flow diagram that illustrates example signal flows in the present system. FIG. 8 includes an endpoint 804, a gateway 808, an ISP DNS server 812, which is part of ISP cloud 810, and a provisioning server 816 and key server 820, which are part of cloud service 814.

At operation 1, provisioning server 816 provisions a domain name and delegated credentials to gateway 808.

At operation 2, a DoH session is established between gateway 808 and ISP DNS server 812 using the delegated credentials.

In operation 3, a TLS handshake begins between endpoint 804 and gateway 808.

In operation 4, which may be parallel to and separate from operation three, private key operations are proxied over TLS between gateway 808 and key server 820.

In operation 5, the TLS handshake is complete.

In operation 6, a DoH or DoT session is established between endpoint 804 and gateway 808.

At operation 7, endpoint 804 sends DNS packets over DoH or DoT to gateway 808. Gateway 808 may respond with cached DNS resolutions if they are available. If not, then gateway 808 may send DNS packets over DoH to ISP DNS server 812.

Some security considerations arise in this architecture. For example, a router platform is typically considered as a closed platform managed by the telco and not accessible to or exposed over the internet. Thus, storing the private key requires appropriate security on routers. Many possibilities are available for morning private keys on routers including:

a. A router platform may have a secure storage or trusted execution environment (TEE). In this case, the key pair may be generated and stored in the TEE. All cryptographic operations requiring the private key happen on the TEE. The private key need never leave the TEE.

b. In the case of a router platform that does not have a TEE, the software-based security storage can be provided by using industry-standard techniques like virtualization, process jailing, chroot-jail, encryption-at-rest, or similar.

Although the delegated credentials require storing private keys on the router, this short lifespan helps to ensure that the keys are periodically renewed and thus minimizes the associated risk.

FIG. 9 is a block diagram of a hardware platform 900. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIGURE QD. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits, FPGAs, and other semiconductor chips.

FIG. 10 is a block illustrating selected elements of an example SoC 1000. At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a personal computer, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
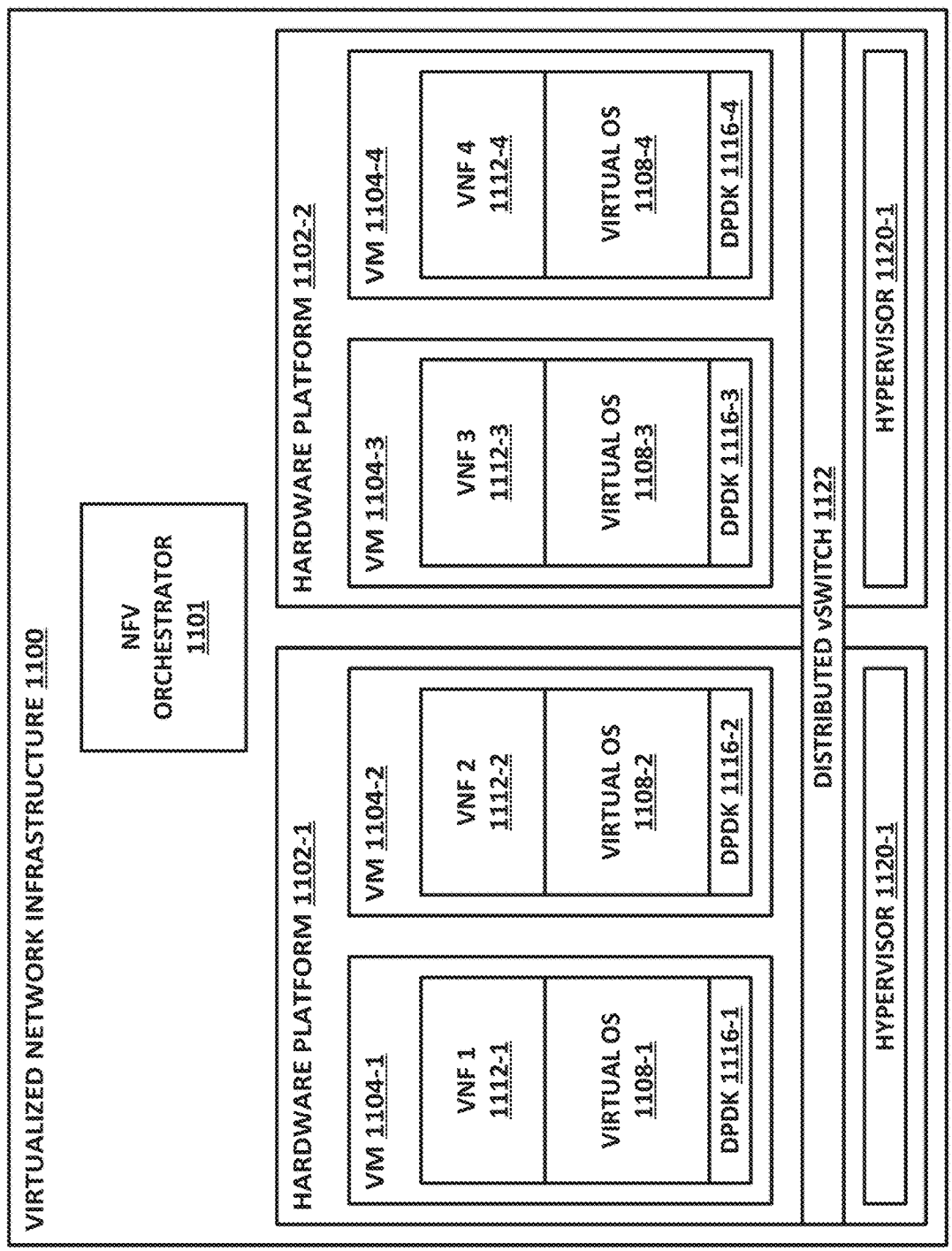
FIG. 11 is a block diagram of selected elements of a network function virtualization (NFV) infrastructure.

FIG. 11 is a block diagram of a network function virtualization (NFV) infrastructure 1100, which provides NFV and other virtualization capabilities. NFV or virtualization may be used, for example, to realize any of the server capabilities illustrated herein such as a secure DNS cloud service or the functions of an ISP.

NFV is an aspect of network virtualization that is generally considered distinct from, but that can still interoperate with, software-defined networking (SDN). For example, VNFs may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun-up") or removed ("spun down") to meet network demands. For example, in times of high load, more load balancing VNFs may be spun-up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., a host fabric interface (HFI)). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
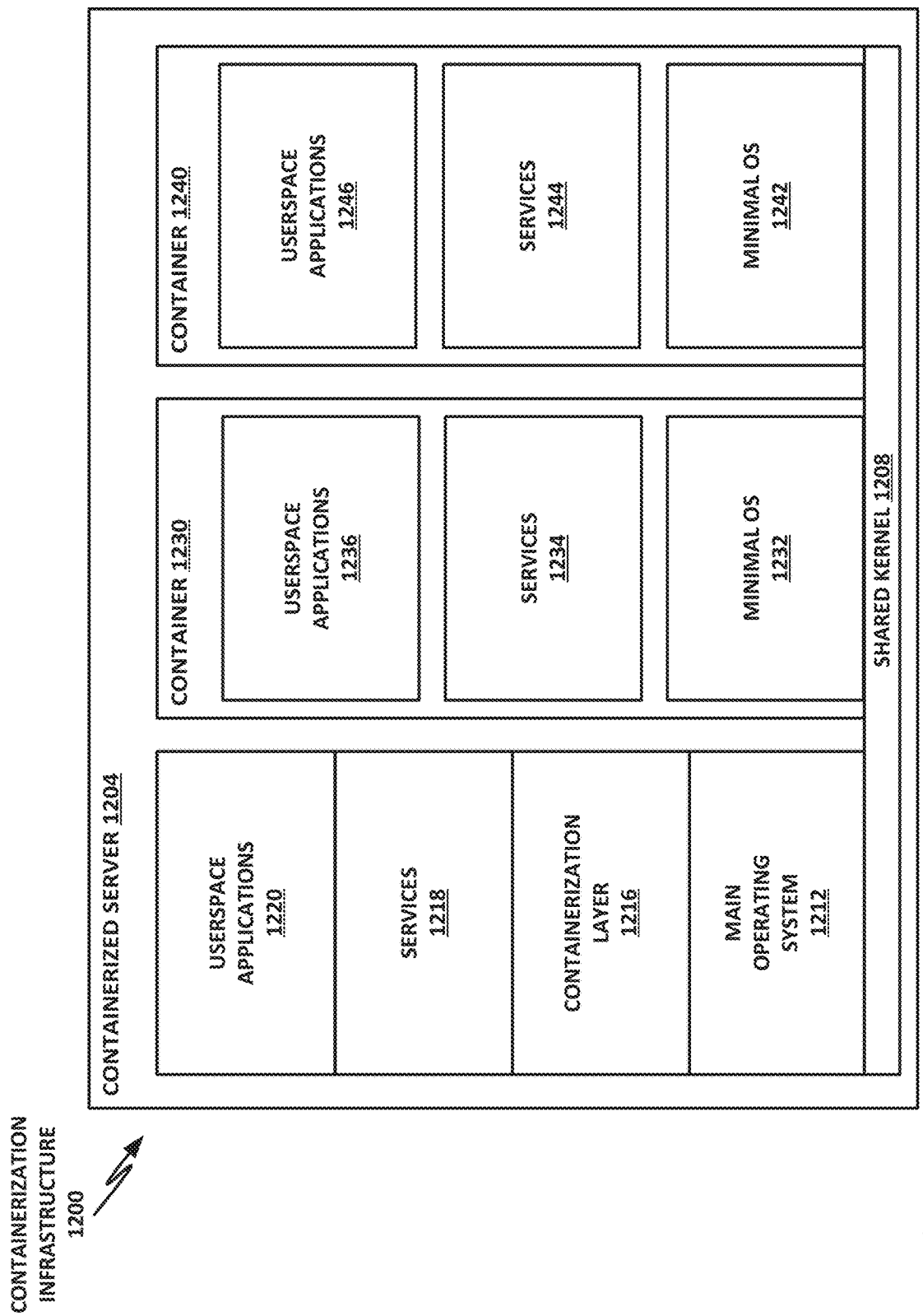
FIG. 12 is a block diagram of selected elements of a containerization infrastructure.

FIG. 12 is a block diagram of selected elements of a containerization infrastructure 1200. Like virtualization, containerization is a popular form of providing a guest infrastructure. Containerization may be used, for example, to realize any of the server functionalities disclosed herein, such as a secure DNS cloud service or the functions of an ISP.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the figures may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the figures may be combined in various configurations, all of which fall within the scope of this specification.

In certain cases, it may be easier to describe one or more functionalities by disclosing only selected element. Such elements are selected to illustrate specific information to facilitate the description. The inclusion of an element in the figures is not intended to imply that the element must appear in the disclosure, as claimed, and the exclusion of certain elements from the figures is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of providing encrypted domain name system (DNS) resolution, comprising:
   receiving, from a device of a first network, a delegated cryptographic credential;
   connecting to a client endpoint on a second network different from the first network, to provide encrypted DNS resolution services to the client endpoint;
   upon determining that the client endpoint supports delegated credentials, providing the encrypted DNS resolution services via the delegated credential; and
   upon determining that the client endpoint does not support delegated credentials, providing the encrypted DNS resolution services via keyless encryption.

2. The computer-implemented method of claim 1, wherein the delegated credential is a cryptographic certificate.

3. The computer-implemented method of claim 1, wherein the delegated credential is not issued directly by a public certificate authority.

4. The computer-implemented method of claim 1, wherein the delegated credential is associated with a fully-qualified domain name (FQDN).

5. The computer-implemented method of claim 1, further comprising providing caching DNS resolution services to the client endpoint.

6. The computer-implemented method of claim 1, further comprising providing DNS forwarding for the client endpoint.

7. The computer-implemented method of claim 1, wherein determining that the client endpoint supports delegated credentials comprises receiving, from the client endpoint, a client hello with a delegated credentials extension.

8. The computer-implemented method of claim 1, further comprising providing, to the client endpoint, the delegated credential as an extension to a TLS certificate verify message.

9. The computer-implemented method of claim 8, wherein the extension is an extension to a certificate entry of an end-entity certificate.

10. The computer-implemented method of claim 1, further comprising, after determining that the client endpoint does not support delegated credentials, providing instructions or a recommendation to update software to support delegated credentials.

11. The computer-implemented method of claim 1, further comprising, upon determining that the client endpoint does not support encrypted DNS resolution services, providing unsecured legacy DNS services via port 53.

12. The computer-implemented method of claim 1, further comprising enrolling via enrollment over secure transport (EST) via the first network.

13. One or more tangible, nontransitory computer-readable storage media having stored thereon executable instructions to:
   receive, from a device of a first network, a delegated cryptographic credential;
   connect to a client endpoint on a second network different from the first network, to provide encrypted DNS resolution services to the client endpoint;
   upon determining that the client endpoint supports delegated credentials, provide the encrypted DNS resolution services via the delegated credential; and
   upon determining that the client endpoint does not support delegated credentials, provide the encrypted DNS resolution services via keyless encryption.

14. The one or more tangible, nontransitory computer-readable storage media of claim 13, wherein the delegated credential is a cryptographic certificate.

15. The one or more tangible, nontransitory computer-readable storage media of claim 13, wherein the delegated credential is not issued directly by a public certificate authority.

16. The one or more tangible, nontransitory computer-readable storage media of claim 13, wherein the delegated credential is associated with a fully-qualified domain name (FQDN).

17. The one or more tangible, nontransitory computer-readable storage media of claim 13, wherein determining that the client endpoint supports delegated credentials comprises receiving, from the client endpoint, a client hello with a delegated credentials extension.

18. The one or more tangible, nontransitory computer-readable storage media of claim 13, wherein the instructions are further to provide, to the client endpoint, the delegated credential as an extension to a TLS certificate verify message.

19. A home gateway, comprising:
   a hardware platform comprising a processor circuit and a memory;

a first network interface to communicatively couple to a first network, the first network comprising a wide area network;

a second network interface to communicatively couple to a second network, comprising a home network; and instructions encoded within the memory to instruct the processor circuit to:

receive, via the first network, a delegated cryptographic credential;

connect to a client endpoint via the second network, to provide encrypted DNS resolution services to the client endpoint;

upon determining that the client endpoint supports delegated credentials, provide the encrypted DNS resolution services via the delegated credential; and upon determining that the client endpoint does not support delegated credentials, provide the encrypted DNS resolution services via keyless encryption.

20. The home gateway of claim 19, wherein the delegated credential is a cryptographic certificate.

* * * * *